R. MASSOHN & J. STRATHUS.
ARRANGEMENT FOR THE PROJECTION OF LANTERN PICTURES.
APPLICATION FILED JULY 26, 1910.
1,024,784.
Patented Apr. 30, 1912.
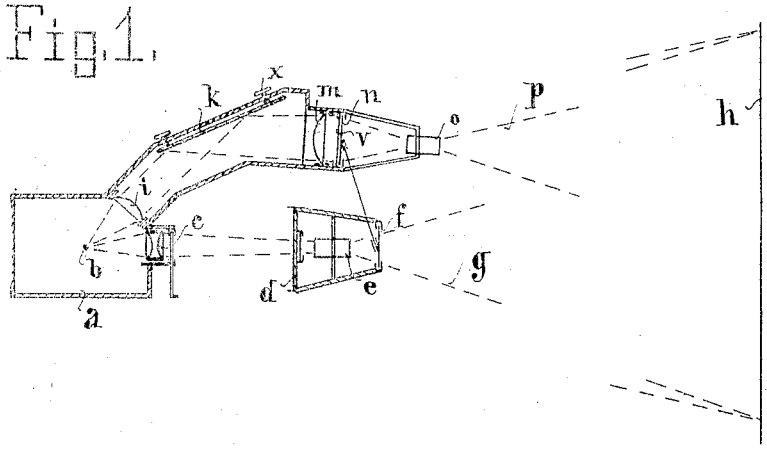
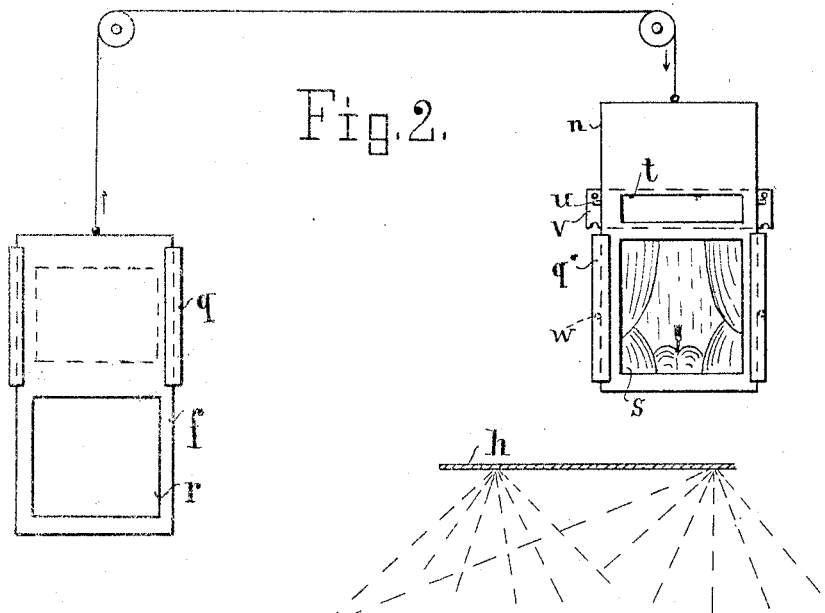
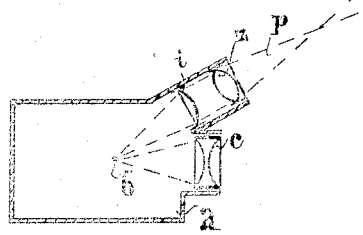
Witnesses.
Inventors.

UNITED STATES PATENT OFFICE.

RICHARD MASSOHN AND JULIUS STRATHUS, OF HAMBURG, GERMANY; SAID MASSOHN ASSIGNOR TO SAID STRATHUS.

ARRANGEMENT FOR THE PROJECTION OF LANTERN-PICTURES.

1,024,734. Specification of Letters Patent. Patented Apr. 30, 1912.

Application filed July 26, 1910. Serial No. 574,011.

*To all whom it may concern:*

Be it known that we, RICHARD MASSOHN and JULIUS STRATHUS, subjects of the German Emperor, residing at Paulinenplatz 2 and Schulterblatt 156, respectively, Hamburg, State of Hamburg, German Empire, have invented certain new and useful Improvements in Arrangements for the Projection of Lantern-Pictures, of which the following is a specification.

This invention relates to a device or an arrangement for the display of lantern pictures, particularly those in series (kinematograph), and has for its object to make use of the source of light for a secondary projection which can be used for various purposes, such as slight illumination of a room, representation of a curtain, title or decoration. The purpose of this secondary projection is, broadly, that by optical means, a portion of the rays thrown from the source of light, which are not used for the projection of the picture, may be collected and thrown in a suitable form on the picture screen or a special screen.

Hitherto the illumination of the spectator-room, especially in kinematographic theaters, has been effected by glow lamps, partially shaded or tinted. By this invention these lamps are quite superseded, and a uniform illumination of the room with diffused light is obtained by means of a beam from the lantern apparatus, which is thrown on a flat surface near the margin of the picture screen, so that by the rays reflected from the surface a general slight illumination of the room results. The reflecting surface may preferably be arranged between the lantern and the picture screen (at half the distance or less). The use of the rays lying outside of the beam of the picture rays is very advantageous, as these would otherwise be wasted. By a special combination of lenses or other optical means outside the condenser for the main cone of rays the other rays are captured, suitably guided and economically turned to account for lighting purposes.

An important way in which the diverted and collected rays of the secondary projection can be used is to show the title. This can be done in various ways. A serviceable form is one in which the title is shown on the margin of the picture field (by means of a slide inserted in the beam of rays) and there it remains so long as the picture lasts when it will be withdrawn with the picture.

By means of a mechanical slide in the beam of rays an impression may be given of a curtain rising at the beginning of the performance, behind which the picture appears. In another useful form a proper representation of a curtain is projected, on which also the title of the picture may be shown which is afterward replaced by the title appearing on the margin of the picture screen.

In the drawing the invention is shown in two forms.

Figure 1 shows in horizontal section, partly diagrammatic, a projecting arrangement with mechanical slides in the light beams. Fig. 2 shows on a larger scale, and separated from the surroundings, a view of a sliding arrangement. Fig. 3 shows in vertical section a modified projecting arrangement which can be used at the same time for illuminating purposes.

From the projecting lantern $a$ the light from the source $b$ passes through the condenser $c$, the film-carrier $d$, the objective $e$ and the opening of the shutter slides $f$, and passes as a light-beam $g$ to the screen $h$. In the apparatus $a$ beam $p$ is collected by a condensing-lens $i$ near the side of the main condenser after which it is reflected from a mirror $k$ through a second condensing lens $m$, then through the opening of a slide $n$ and an objective $o$ so as to cover about the same space on the screen $h$ as that occupied by the beam $g$.

The shutter slides $f$ and $n$ are arranged as follows (Fig. 2): Both slides work in guides $q$. In consequence of the arrangement of the slides $f$ and $n$ in front of the objective $e$ and the condenser $m$ respectively they must work in opposite directions in order to produce corresponding effects upon the screen. Slide $f$ contains the picture-opening $r$ and slide $n$ a curtain-opening $s$. The two openings are so arranged between the guides that during the passage of the beam through the curtain-opening the picture-opening is covered by the slide $f$ (as shown in sketch). Conversely while the picture-rays are admitted through $r$ the slide $n$ closes. The action of the two slides is thus so adjusted that with the appearance on the screen of the lower edge of the curtain the upwardly moving upper edge of the picture slide appears on the screen and the two edges by the further movement of the slides at last fall together till the picture slide *r* is quite opened and the curtain slide shut. The effect will thus be produced of a curtain being raised behind which the picture appears. The curtain in the opening *s* may also conveniently bear the title. In order to have a title still visible at the outside of the picture after the disappearance of the curtain an additional opening *t* is provided in the slide *n* which likewise contains the title of the picture. This opening *t* remains closed by a small slide *v* resting on stops *u* of the slide *n* till the upper picture edge has reached the lower curtain edge in the picture. Meanwhile the lower edge of the slide *v* is overtaken by the projection *w* of the carrier *q*, the slide *v* is brought to a stand which uncovers the opening *t*, so that the title appears above (or under) the picture which has now also been uncovered. Obviously the title can be shown also on any other place outside the picture or the screen. The mirror *k* can be adjusted by set screws *x*. Also by assistance of the rays of the secondary projector, prosceniums, decorations, and such-like may be shown. If both the shutters *f* and *n* are arranged to cover the objectives or condenser lenses they must be moved simultaneously.

In the drawing the working connection of the slides is shown as cords passing over rollers, but other modes of connection may of course be used.

In the arrangement shown in Fig. 3 the light source *b* sends the main beam through the condenser *c* and a secondary beam *p* through the lenses *i* and *z* which are set in a tube near the condenser *c*. The rays of this beam are thrown upon suitably provided surfaces on the wall *h* which may be the wall of the room or a specially provided screen.

It is evident that one or more projectors may be arranged around the main condenser for the purposes specified.

We claim:

1. In an optical projecting apparatus, a source of light, a primary lens system positioned in operative relation with respect to said source for collecting the main light rays for the projection of a picture upon a suitable surface, a secondary lens system positioned in operative relation with respect to said source for collecting and projecting some of the rays thrown from said source which are useless for projection in the primary lens system, means whereby these latter collected rays can be utilized for illuminating or for projecting of the representation of a curtain, title or decoration, and shiftable shutters associating with said systems and constituting means whereby the rays collected by one system can be projected while the projecting of the rays collected by the other system is shut off, the shutter for the secondary system provided with a pair of openings, one of which is adapted to allow of the projecting of the light rays therethrough simultaneously with the projecting of the light rays by the primary system.

2. In an optical projecting apparatus for utilizing some of the rays thrown from a source of light which are not used in the projecting of the picture, a source of light, a primary lens system for collecting the main light rays for the projecting of a picture, a secondary lens system arranged adjacent to the primary lens system and including a condensing lens angularly-disposed with respect to the primary and adapted to collect and project those rays thrown from said source which are useless for picture projection whereby the said collected rays can be utilized for illuminating or other purposes, a pair of shiftable shutters associating with said systems and constituting means whereby the rays collected by one system can be projected while the projecting of the rays collected by the other system are shut off, a special shutter on the secondary shutter which is adapted to allow of the projecting of the light rays simultaneously with the projecting of the light rays by the primary system.

3. In an optical projecting apparatus, a source of light, a primary lens system positioned in operative relation with respect to said source for collecting the main light rays for the projecting of a picture upon a suitable surface, a secondary lens system positioned in operative relation with respect to said source for collecting and projecting some of the rays thrown from said source which are useless for picture projection, means whereby these latter collected rays can be utilized for illuminating or for projecting of the representation of a curtain, title or decoration, and shiftable shutters associating with said systems, and constituting means whereby the rays collected by one system can be projected while the projecting of the rays collected by the other system is shut off, one of said shutters provided with a curtain opening and the other with a picture opening, said shutters arranged in such relation with respect to each other whereby as that shutter provided with the picture opening is shifted to allow of the projecting of the picture the effect produced will be that as of a curtain being raised behind which the picture appears, and means whereby the title of the picture can be projected simultaneously with the projecting of the picture.

4. In an optical projecting apparatus for utilizing some of the rays thrown from a source of light which are not used in the projecting of a picture, a source of light, a primary lens system for collecting the main light rays for the projecting of a picture, a secondary lens system arranged adjacent the primary lens system and including a condensing lens angularly-disposed with respect to the primary and adapted to collect and project some of the rays thrown from said source which are useless for picture projection whereby the said collected rays can be utilized for illuminating or other purposes, a pair of shiftable shutters associating with said systems and constituting means whereby the rays collected by one system can be projected while the projecting of the rays collected by the other system are shut off, and the special shutter on the secondary shutter which is adapted to allow of the projecting of the light rays simultaneously with the projecting of the light rays by the primary system, and stops on the guiding pieces for the secondary shutter adapted to engage the special shutter with the secondary shutter.

5. In an optical projecting apparatus, a source of light, a primary lens system positioned in operative relation with respect to said source for collecting the main light rays for the projection of a picture upon a suitable surface, a secondary lens system positioned in operative relation with respect to said source for collecting and projecting some of the rays thrown from said source which are useless for projection in the primary lens system, means whereby these latter collected rays can be utilized for illuminating or for projecting of the representation of a curtain, title or decoration, and shiftable shutters associating with said systems and constituting means whereby the rays collected by one system can be projected while the projecting of the rays collected by the other system is shut off, said secondary shutter provided with means to allow of the projecting of light rays therethrough simultaneously with the projecting of the light rays by the primary system.

In testimony whereof we have affixed our signatures in presence of two witnesses.

RICHARD MASSOHN.
JULIUS STRATHUS.

Witnesses:
ERNEST H. L. MUMMENHOFF,
EDUARD HOPF.